United States Patent
Sur (10) Patent No.: US 9,811,403 B1
(45) Date of Patent: Nov. 7, 2017

(54) METHOD, APPARATUS AND SYSTEM FOR PERFORMING MATCHING OPERATIONS IN A COMPUTING SYSTEM

(71) Applicant: Intel Corporation, Santa Clara, CA (US)

(72) Inventor: Sayantan Sur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/189,103

(22) Filed: Jun. 22, 2016

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .............. *G06F 9/546* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 5,125,083 A * | 6/1992 | Fite | | G06F 9/3816 712/207 |
| 6,338,095 B1 * | 1/2002 | Yasuda | | G06F 9/544 370/351 |
| 7,774,374 B1 * | 8/2010 | Kizhepat | | H04L 49/101 707/800 |
| 8,170,041 B1 | 5/2012 | Underwood et al. | | |
| 8,239,867 B2 * | 8/2012 | Zarzycki | | G06F 9/52 718/100 |
| 2003/0200315 A1 * | 10/2003 | Goldenberg | | H04L 47/10 709/225 |
| 2006/0123156 A1 * | 6/2006 | Moir | | G06F 9/466 710/33 |
| 2011/0265098 A1 | 10/2011 | Dozsa et al. | | |
| 2012/0054451 A1 * | 3/2012 | Chang | | G06F 15/167 711/152 |
| 2012/0243542 A1 | 9/2012 | Sugumar et al. | | |
| 2013/0312011 A1 | 11/2013 | Kumar et al. | | |
| 2014/0129635 A1 | 5/2014 | Hefty et al. | | |
| 2014/0207881 A1 * | 7/2014 | Nussle | | G06F 15/1735 709/206 |
| 2015/0009831 A1 * | 1/2015 | Graf | | H04L 47/31 370/236 |

(Continued)

OTHER PUBLICATIONS

Mark S. Birrittella, et al., "Intel® Omni-Path Architecture, Enabling Scalable, High Performance Fabrics," 2015, 9 pages.

(Continued)

*Primary Examiner* — Chat Do
*Assistant Examiner* — William C Wood
(74) *Attorney, Agent, or Firm* — Trop, Pruner & Hu, P.C.

(57) ABSTRACT

In one embodiment, an apparatus includes: a plurality of queues having a plurality of first entries to store receive information for a process; a master queue having a plurality of second entries to store wild card receive information, where redundant information of the plurality of second entries is to be included in a plurality of redundant entries of the plurality of queues; and a control circuit to match an incoming receive operation within one of the plurality of queues. Other embodiments are described and claimed.

15 Claims, 8 Drawing Sheets

(56) References Cited

U.S. PATENT DOCUMENTS

2015/0305006 A1  10/2015  Magro et al.
2016/0072906 A1  3/2016  Shuler et al.
2016/0117243 A1*  4/2016  Allen .................. G06F 9/546
                                                711/102

OTHER PUBLICATIONS

Intel Corporation, "Intel® Omni-Path Host Fabric Interface, Platform Configuration Reference Guide," Nov. 2015, 28 pages.
Mario Flajslik, et al., "Mitigating MPI Message Matching Misery," Jun. 20, 2016, 19 pages.
International Searching Authority, "Notification of Transmittal of the International Search Report and the Written Opinion of the International Searching Authority," dated Aug. 8, 2017, in International application No. PCT/US2017/033248.

* cited by examiner

METHOD, APPARATUS AND SYSTEM FOR PERFORMING MATCHING OPERATIONS IN A COMPUTING SYSTEM

TECHNICAL FIELD

Embodiments relate to processing incoming messages in a computing system.

BACKGROUND

The Message Passing Interface (MPI) exposes a partially ordered queue of receive operations to applications. Receive operations for messages may target a particular source process or a wild card receive operation indicates that the message may target any process. Messages are matched in the order in which the receive operations were posted, typically on a per source basis.

Most MPI implementations provide a fully ordered sequential queue. As such, incoming messages search the queue sequentially, thereby leading to lengthy search times when a posted receive queue is long. Some solutions employ a hashing technique to separate out incoming messages that target multiple queues. However, this technique suffers from an overhead in use of a complicated hash. Wild card searching further complicates such techniques.

DETAILED DESCRIPTION

Figure 1:
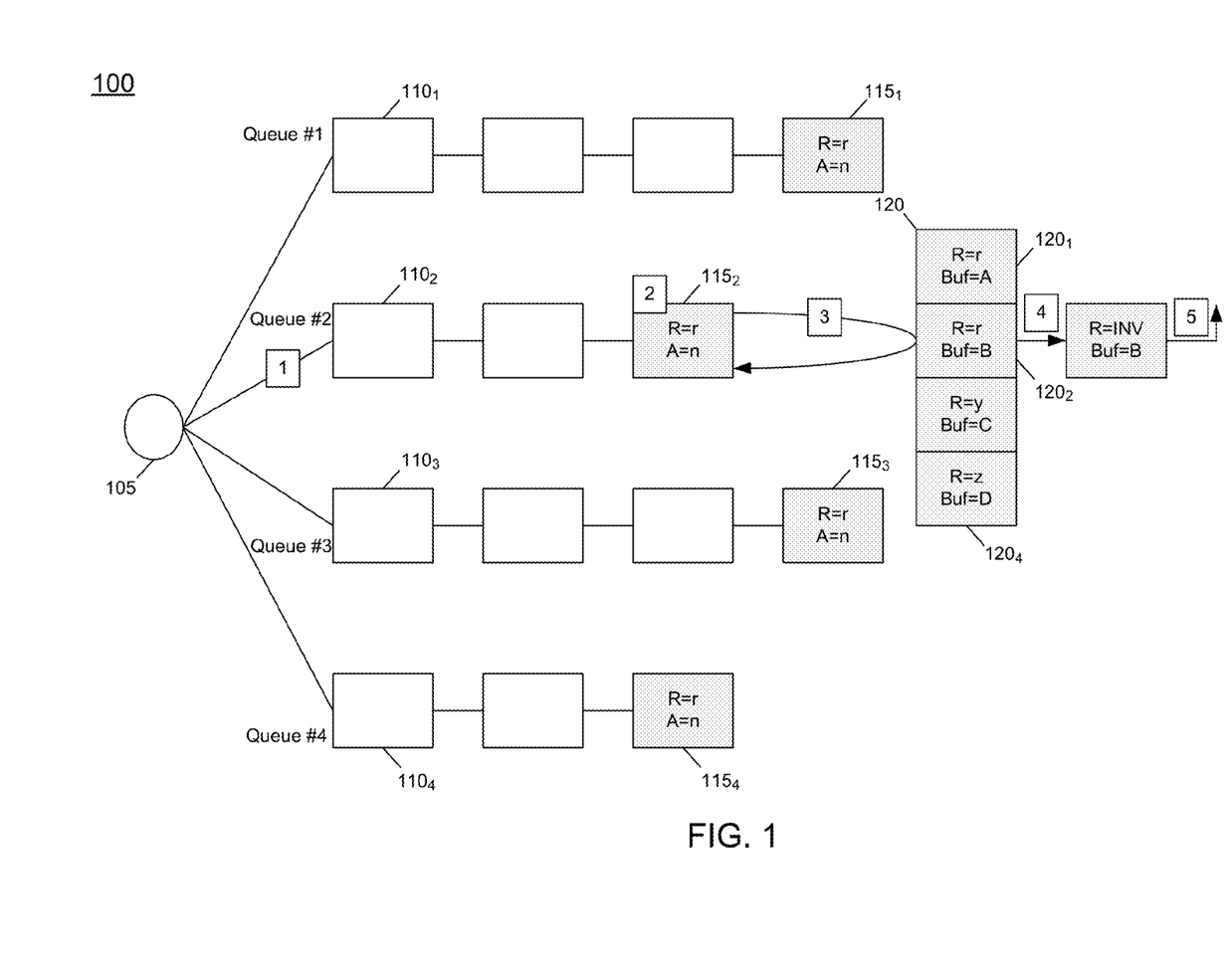
FIG. 1 is a block diagram of a portion of a system in accordance with an embodiment of the present invention.

Referring now to FIG. 1, shown is a block diagram of a portion of a system in accordance with an embodiment of the present invention. More specifically, FIG. 1 shows a system portion 100 that includes a set of queues $110_1$-$110_4$ (generically queues 110). As illustrated, queues 110 may be coupled to a network endpoint 105. Understand that network endpoint 105 may be included in any type of device of a system. As examples, network endpoint 105 (and queues 110) may be present in a host fabric interface or other network infrastructure. In other cases network endpoint 105 may be a network interface circuit of a general-purpose processor, and queues 110 may be implemented within host memory. In some cases, a host fabric interface may be implemented within a particular computing system to act as an interface between the system and additional network circuitry, such as a switch that in turn couples together multiple computing systems, each potentially including host fabric interface circuitry. In some cases, each of these host computer systems may be referred to as a "node." Via a switch or other circuitry, these multiple nodes, which may collectively form given partitions, clusters or other groups of compute nodes, may in turn couple to additional portions of a network via one or more communication fabrics. Of course many other arrangements are possible.

As will be described herein, note that queues 110 may be instantiated during initialization operations, e.g., by an MPI library that executes on the given system. To this end, a control circuit, such as a microcontroller, one or more cores, other types of processing units or other hard-coded logic circuitry may be present to execute at least portions of the MPI library. For purposes of discussion herein, assume that the arrangement shown in FIG. 1 is at a receive end and that queues 110 are receive queues for purposes of handling receive operations (generically described herein as a "receive" or "receives" for convenience). Also understand while only four separate queues $110_1$-$110_4$ are shown, different implementations can accommodate many different numbers of queues. In some cases, the number of independent queues may be static or substantially static, according to a configuration of a particular implementation of MPI library.

As shown in FIG. 1, a receiving process (or more specifically the MPI library at the receiver side) maintains a plurality of tag queues $110_1$-$110_4$. Each tag queue 110 may be associated with one or more processes. As one particular example, each tag queue 110 may be associated with a communicator, which in turn may include a group of one or more processes. In an embodiment, tag queues 110 may be implemented as linked lists to preserve the order in which receives are posted. As such, during message matching, such queues or lists can be searched for a match beginning with the oldest entry at the head of a list. Note that tag queues 110 are for handling posted receive operations, namely these queues may be configured to store metadata and other context information regarding messages for which a receiving process is ready to accept.

Note that in one particular embodiment, the matching may be performed according to communicator (C), source rank (S) and tag (T), such that each entry may be described by a tuple of (C), (S), (T). Wild card operations may be denoted with a "*" to refer to an incoming message that can match to any item of the wild carded field (e.g., one or more of C, S, T). With this configuration, all senders are implicitly divided to map to one of tag queues 110, in that each sender may be configured to target a particular queue using, e.g., a simple modulo hash operation. Using an embodiment of the present invention, posted receive operations may be controlled to only be ordered within a single one of tag queues 110.

System portion 100 further includes a master wild card array 120, including a plurality of wild card entries $120_1$-$120_4$ coupled to tag queues 110. As will be described herein, master wild card array 120 may be configured to be a primary storage for information associated with wild card receives. In addition to master wild card array 120, a replica wild card entry (e.g., entries $115_1$-$115_4$, generically replica entry 115) may be appended to queues 110. Each replica entry 115 may be configured to point to an entry in master wild card receive array 120. In an embodiment, each wild card receive may be replicated into all queues 110, and more specifically into replica entry 115 (since any queue may receive a matching message). In the illustrated embodiment in FIG. 1, all replica wild card entries 115 point to the same entry in master wild card receive array 120. Note that in a given implementation, each queue includes a number of replica entries, namely there is a separate entry in each queue corresponding to a receive entry in master wild card receive array 120. In addition, every wild card receive entry 115 is assigned a receive ID (r), which is separate from all other tags and other identifiers. In an embodiment, a single receive ID may be used to identify all the replica entries in the tag queues that thus point to a single master wild card receive entry within master wild card receive array 120. As further described herein, this receive ID or number may be used to remove or detect stale/extra wild card receive entries that have not been matched. When an incoming message matches a replicated wild card receive entry 115 in a particular queue 110, the corresponding entry in master wild card array 120 may be consumed in an atomic fashion.

With a parallel queue configuration as in FIG. 1, when a message arrives only one queue 110 is searched (namely the matching queue, e.g., based on a tag match). Using an embodiment such as in FIG. 1, assuming a uniform distribution of senders, the average length of queue to be searched can be determined by dividing by the number of queues.

Using an embodiment as described herein, the computation expense and latencies incurred in requiring reference to a separate bucket that contains wild card receives can be avoided for the majority of receivers, which reduces both the matching cost and the cost of determining whether any matching wild card receives were posted before a receive that otherwise matched. As such without an embodiment as described herein, overhead is added even when an initial match would have been the winner. And without using an embodiment, observed messaging rates are lower by incurring additional instructions to handle all messages.

Thus embodiments may reduce length of queue to be searched in the critical path, and may further enable flexibility by allowing each queue to be searched independently and in parallel. Still further, by using embodiments herein, run-time costs associated with managing wild card receives are completely isolated to situations where wild cards are actually used and matched. Stated another way, the costs associated with wild card support essentially drops to zero for applications that do not use wild card receive operations. Note further that applications do not have to indicate a priori whether they will use wild card receives or not, and enjoy the benefits of parallel tag matching.

As such, embodiments do not suffer from unnecessary overhead in searching the wild card queue in the case where the incoming message matches a normal posted receive. Instead, overhead for handling wild card receives is encountered only in situations where wild card receives are actually selected for matching. Note that a vast majority of MPI applications do not use wild card receives in a performance sensitive manner. As such, by isolating any performance overhead in matching wild card receives to the situation where they are actually matched, more efficient matching operations for typical cases is realized.

FIG. 1 further illustrates the basic operation when a receiver receives a message that matches one wild card receive. More specifically, FIG. 1 illustrates the steps performed when an incoming message matches a wild card receive in queue $110_2$. Once the message is matched, an atomic compare and swap operation may be used to consume a master receive entry. Note that processing of a match operation does not involve removing all the replica receive entries (e.g., entries $115_1$ and $115_{3,4}$). In the above example, the receive number "r" remains linked in queues $110_1$, $110_3$, $110_4$. Note that complexity of one or more agents that perform matching may be reduced, as embodiments may allocate tag queues 110 such that each queue is a private data structure to the agent. Over time, the receive ID's themselves may be re-used since they have a finite bit width. For example, the system may only be designed to support 64K wild card receive operations. In that scenario, the receive ID can be a 16 bit wide field. In an embodiment, the MPI library may manage the usage of receive ID numbers, as the MPI library may be configured to determined when a receive ID is to be re-used. In this situation, the MPI library may issue a command to reap stale replica receive entries from the other queues (such as entries $115_1$, $115_3$ and $115_4$ in FIG. 1). In an embodiment, given hardware such as a host fabric interface may process the reap operation. At completion, the hardware may report completion to the MPI library, which then can re-use the given receive ID.

Another operation that embodiments may support is canceling of wild card receives, e.g., by MPI applications. The implementation of such cancel operation includes an atomic compare and swap in the master wild card receive array. This can be followed by a reap operation in the individual tag queues. Applications are typically not sensitive of receive cancel operation latency. Understand while shown with this particular implementation in the embodiment of FIG. 1, many variations and alternatives are possible.

Figure 2:
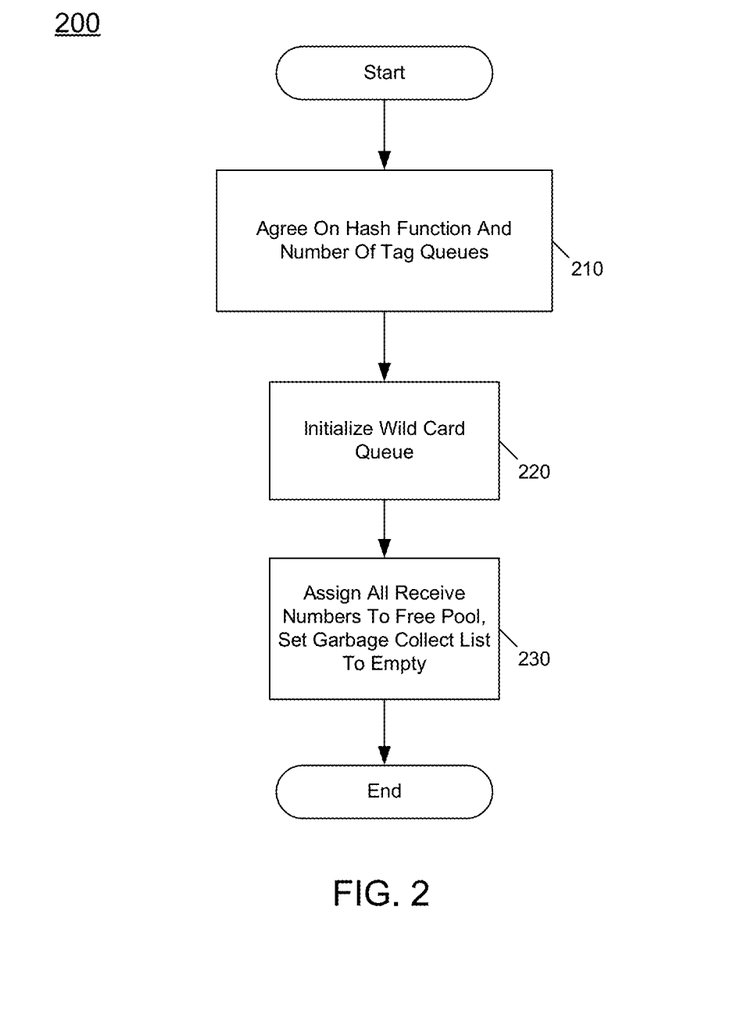
FIG. 2 is a flow diagram of a method in accordance with an embodiment of the present invention.

Referring now to FIG. 2, shown is a flow diagram of a method in accordance with an embodiment of the present invention. More specifically, method 200 shown in FIG. 2 is an initialization method which may be performed, e.g., by an MPI library (or portion thereof). To this end, a given network endpoint may include any type of processing hardware, such as a microcontroller, one or more cores or other such control circuitry or so forth to perform the initialization operations described. As illustrated in FIG. 2, method 200 begins by enabling a sender and receiver, namely a sender process, e.g., of a first computing system and a receiver process, e.g. of a second computing system to agree on a hash function and a number of tag queues, such that this plurality of tag queues can be initialized (block 210). As an example, a given MPI library implementation may be configured to arrange N parallel sets of tag queues. In some embodiments this number may be fixed on configuration, while in other cases, the number of independent parallel tag queues can dynamically vary, e.g., based on workload or so forth. Understand that the location of these tag queues may vary in different embodiments. In some cases, such queues may be implemented in hardware of a host fabric interface or other network circuitry. In other cases, such queues can be implemented within host memory, e.g., within a dynamic random access memory (DRAM).

Still referring to FIG. 2, next at block 220 a wild card queue may be initialized. Understand that this wild card queue corresponds to a master wild card array including a plurality of entries to store information associated with wild card receives. Next at block 230 all receive numbers can be assigned to a free pool, and a garbage collect list may be set to an empty status, since at this point in operation no garbage collection activities are to occur. Understand while shown at this high level in the embodiment of FIG. 2, many variations and alternatives are possible.

Figure 3:
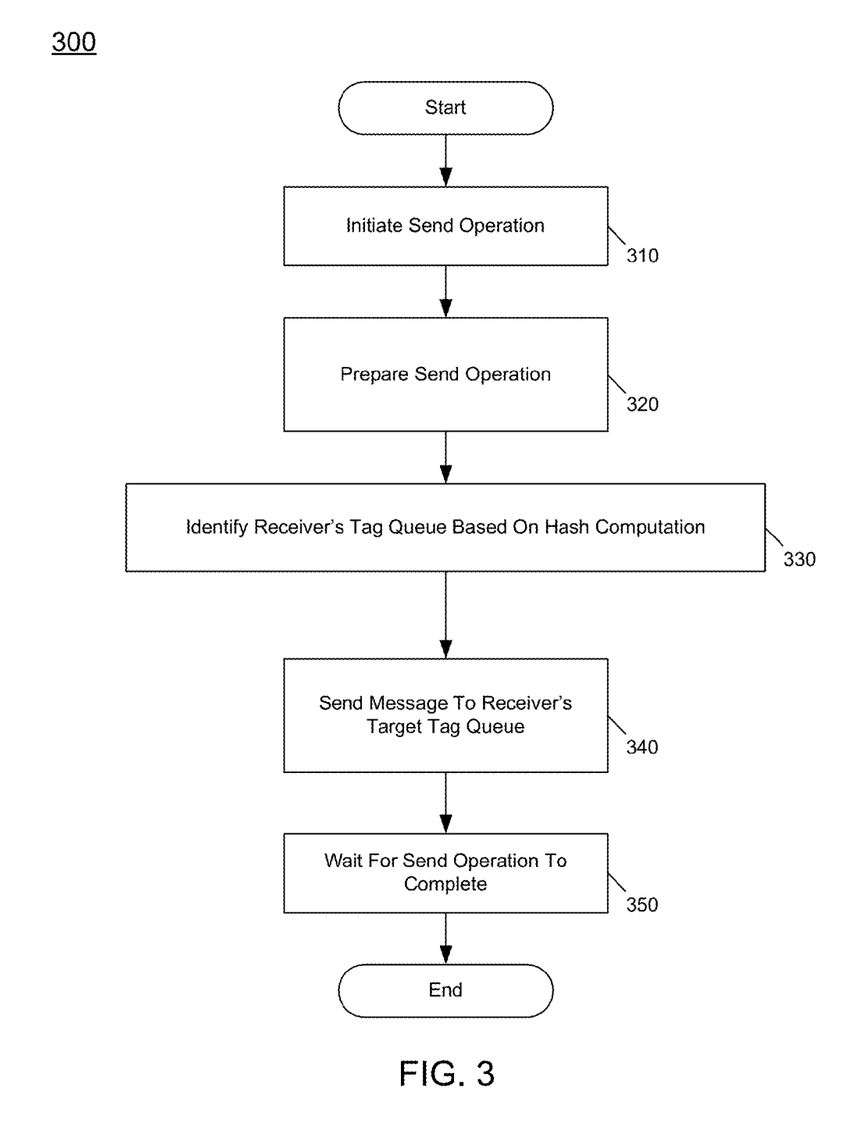
FIG. 3 is a flow diagram of a method in accordance with another embodiment of the present invention.

Referring now to FIG. 3, shown is a flow diagram of a method in accordance with another embodiment of the present invention. As shown in FIG. 3, method 300 may be performed when a sender is sending a message. As such, the various operations shown in FIG. 3 may be performed within the sender process (and thus within a sending computing system). As illustrated, method 300 begins by initiation of a send operation (block 310). Note that such initiation of the send operation can be performed by a requesting application. Next at block 320 a send operation is prepared.

In an embodiment, such preparation may be started by a MPI library. Thereafter, control passes to block 330 where a receiver's tag queue can be identified based on a hash computation. In one embodiment, the hash computation may be performed using a source rank and a total number of receiver queues to thus identify the target queue (e.g., hash[source rank, number of receiver queues]).

Still with reference to FIG. 3, thereafter at block 340 the message can be sent to the receiver's target tag queue. Finally, at block 350 the sender process can wait for the send operation to complete. In an embodiment, the send operation may be completed by a receipt of a completion message from the receiver. Understand while shown at this high level in the embodiment of FIG. 3, many variations and alternatives are possible.

Figure 4:
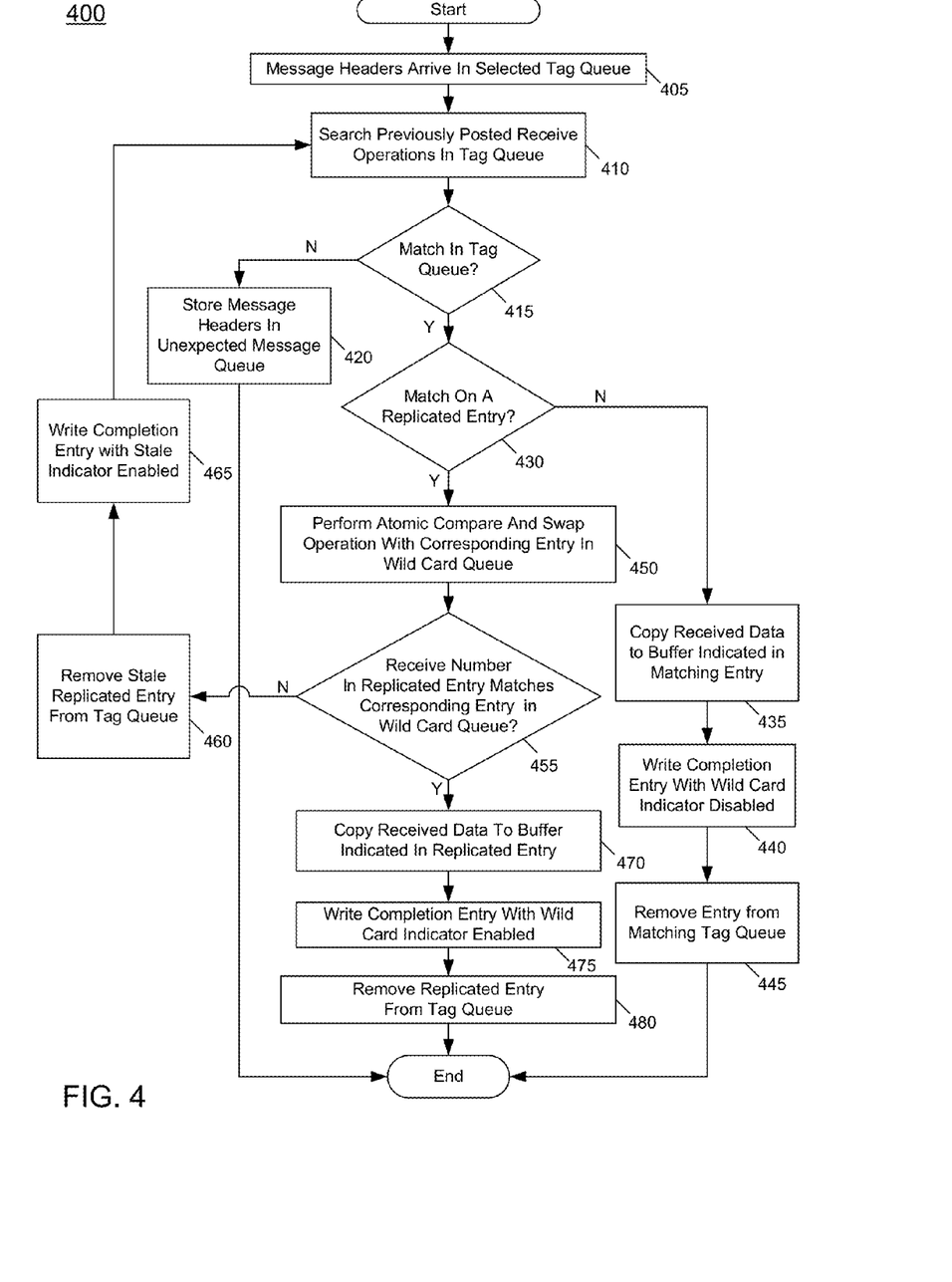
FIG. 4 is a flow diagram of a method in accordance with another embodiment of the present invention.

Referring now to FIG. 4, shown is a flow diagram of a method in accordance with another embodiment of the present invention. As shown in FIG. 4, method 400 may be performed when a receiver is receiving a message. As such, the various operations shown in FIG. 4 may be performed within the receiver process (and thus within a receiving computing system). In some embodiments, at least portions of method 400 may be performed by an MPI library, as described herein. As illustrated, method 400 begins by receiving one or more incoming messages via a network endpoint (block 405). More specifically, at block 405 one or more message headers arrive in a selected tag queue. Then at block 410 previously posted received operations may be searched in a tag queue, to determine whether a match in the tag queue is identified (diamond 415). More specifically, once the selected tag queue is identified, the entries in the queue can be iteratively matched with information in the message to determine whether a matching entry is present in the tag queue. As an example, a varying amount of information of tag matching can be performed to match according to various criteria including tag, source rank information, communicator information and so forth. If no match is identified, the one or more message headers may be stored in an unexpected message queue (block 420), as no entry within the selected tag queue has been set up for the message.

Further with reference to FIG. 4, if a match is identified in the selected tag queue, next it is determined at diamond 430 whether the match is on a replicated entry (namely a redundant entry that points to a master wild card array). If not, control passes to block 435, where a flow of typical message processing can occur. More specifically as shown in FIG. 4, at block 435 based on information present in the matching entry, data of the received message can be copied, e.g., to a receive buffer of a given process. Thereafter, at block 440 a completion entry may be written with a wild card indicator (e.g. wild card bit) disabled. In an embodiment, this completion entry may be written to a completion queue. The MPI library polls the completion queue to detect operations that have been marked complete by the host fabric interface. In some embodiments, there may not be a completion queue; instead the MPI library can call a routine to check what operations have completed. Finally, at block 445 the matching corresponding entry can be removed from the matching tag queue. Of course other operations to complete the message, including potentially sending a completion back to the sender, clearing queue entries or so forth, also may occur.

Still with reference to FIG. 4 if instead the match is in a replicated entry, control passes to block 450 where an atomic compare and swap operation may be performed. More specifically, this compare and swap operation may be performed between the replicated entry in the given tag queue and the corresponding entry in the wild card queue. Thereafter, control passes to diamond 455, where it is determined whether the receive number in the replicated entry matches the corresponding entry in the wild card queue. If there is no match, as determined at diamond 455, control passes to block 460 where a stale replicated entry may be removed from the given tag queue. Thereafter, at block 465 a completion entry can be written with a stale indicator (e.g., a stale bit) enabled. As illustrated, control thereafter passes back to block 410, discussed above.

Still with reference to FIG. 4, if it is determined at diamond 455 that the receive number in the replicated entry matches the corresponding entry in the wild card queue, control passes to block 470. At block 470, the received data may be copied to a buffer indicated in the replicated entry. Note that this buffer indicator was obtained from the compare and swap operation, as this buffer identifier originally resided in the wild card queue entry, prior to the compare and swap atomic operation. Thus at this point the data of the message has been provided to its requested destination. Additional operations to complete the message, as discussed above may occur. More specifically, at block 475 a completion entry can be written with the wild card indicator enabled, and thereafter at block 480 the replicated entry can be removed from the given tag queue. Understand that these operations may occur responsive to the completion of the write, or they may be scheduled at a later time, such as during times when active workloads are less than a given threshold. Note that the completion writing may depend on various queues within the host fabric interface being flushed. Understand while shown at this high level in the embodiment of FIG. 4, many variations and alternatives are possible.

Figure 5:
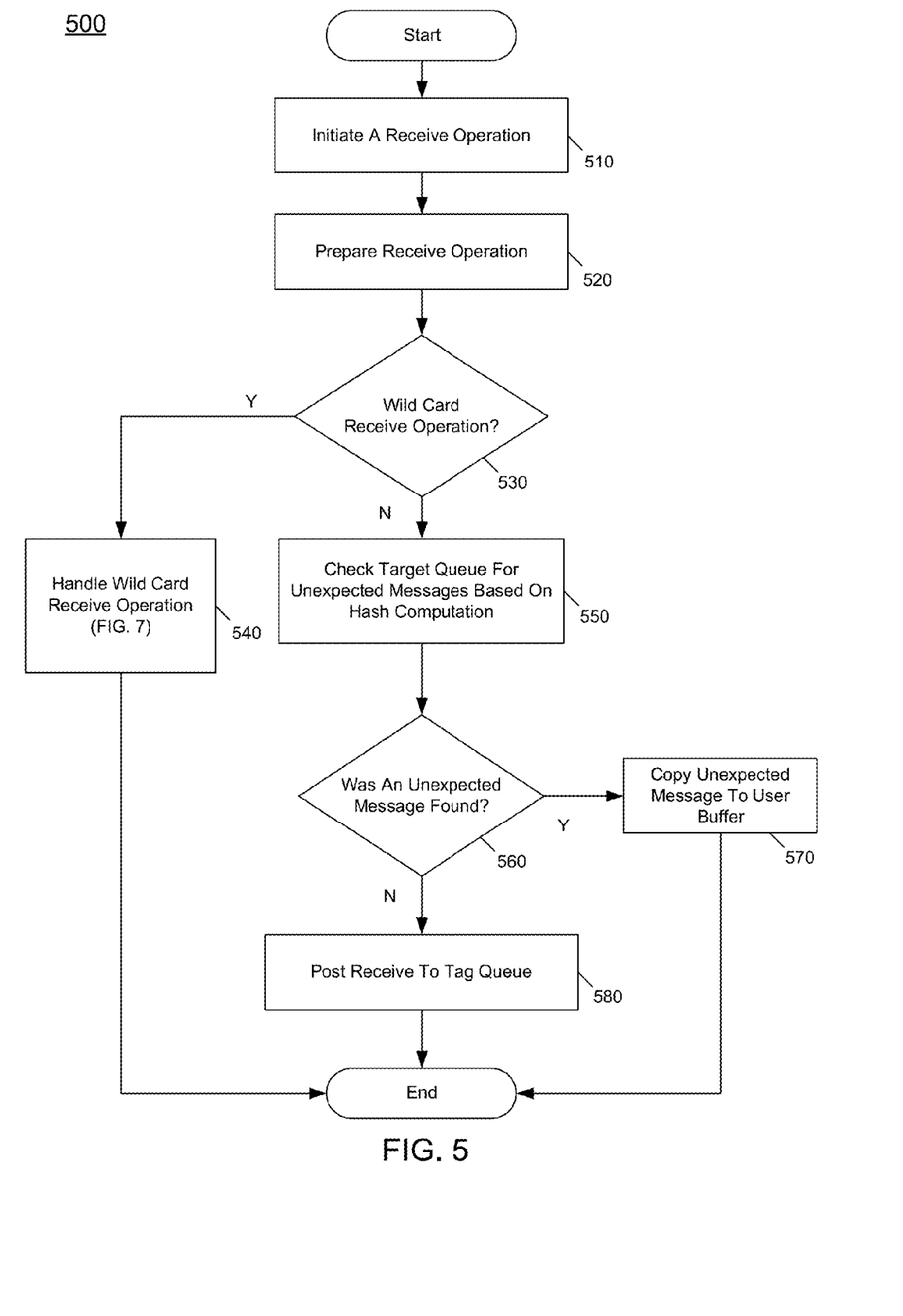
FIG. 5 is a flow diagram of a method in accordance with yet another embodiment of the present invention.

Referring now to FIG. 5, shown is a flow diagram of a method in accordance with yet another embodiment of the present invention. As shown in FIG. 5, method 500 may be used to perform operations within a receiver when an application initiates a receive operation. As illustrated, method 500 begins by initiation of a receive operation, which in an embodiment may be initiated by a given application (block 510). Thereafter at block 520 this receive operation can be prepared. In an embodiment, the MPI library may act to start preparing this receive operation. Next at diamond 530 it is determined whether the receive operation is a wild card receive operation. If so, control passes to block 540 where the wild card receive operation can be handled. An embodiment of such handling will be discussed below with regard to FIG. 7.

Still with reference to FIG. 5, if instead it is determined that the receive operation is not a wild card operation, namely a receive operation for a particular tuple, control passes to block 550 where a target queue can be checked for unexpected messages. In an embodiment, such determination can be based on a hash computation, where the identified target queue can be based on a hash of a source rank and total number of receiver queues. Responsive to this determination next it is determined whether an unexpected message was found (diamond 560). If so, the unexpected message can be copied to a user buffer, e.g. of the receiver process (block 570). Finally, if no unexpected message was found as determined at diamond 560, control passes to block 580. Note that the tag queue may also have a corresponding queue of unexpected messages that have arrived, sorted in the order of their arrival. This otherwise hidden queue may be searched at block 550 (with criteria for determining a match may be as in block 410, discussed above), where the receive operation can be posted to the given tag queue. Understand while shown at this high level in the embodiment of FIG. 5, many variations and alternatives are possible.

Figure 6:
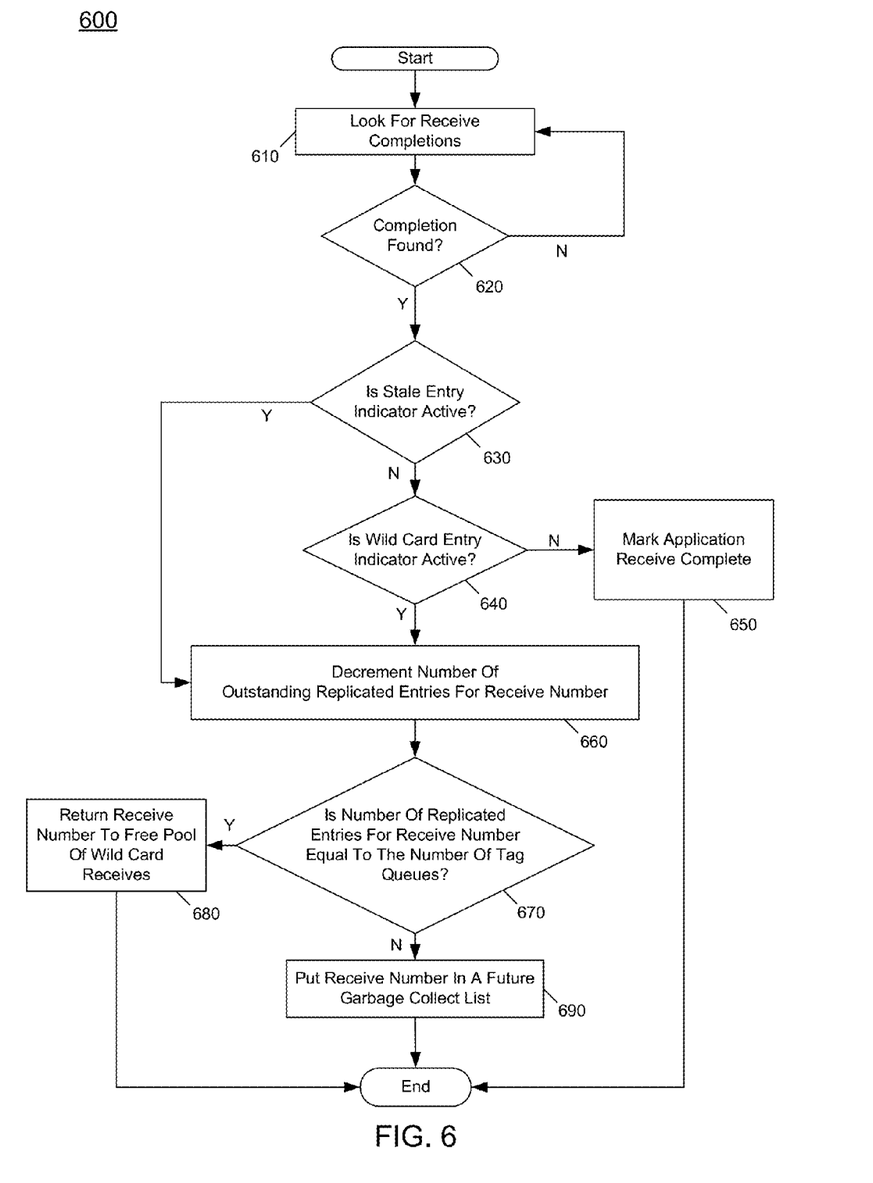
FIG. 6 is a flow diagram of a method in accordance with yet another embodiment of the present invention.

Referring now to FIG. 6, shown is a flow diagram of a method in accordance with yet another embodiment of the present invention. More specifically, method 600 shown in FIG. 6 may be used within a receiver when a receive completion has been reported. As illustrated, method 600 begins by looking for receive completions (block 610). Such completions may be searched for generally in a completion queue to which the host fabric interface writes. In other cases, a function call may return the next completion by the communication infrastructure (as in an onload model). Next it is determined at diamond 620 whether a completion has been found. If so, control passes to diamond 630 to determine whether a stale entry indicator is active. If the stale entry indicator is not active, control passes to diamond 640, to determine whether a wild card entry indicator is active. If not, at block 650 the application receive is marked as complete, and method 600 concludes.

From both of diamonds 630 and 640, control passes to block 660, where a number of outstanding replicated entries can be decremented for the given receive number. Thereafter, at diamond 670 it is determined whether the number of replicated entries for the receive number is equal to the number of tag queues. If so, control passes to block 680 where the receive number may be returned to the free pool of wild card receives. Otherwise, at block 690 the receive number may be placed into a future garbage collect list. Understand while shown at this high level in the embodiment of FIG. 6, many variations and alternatives are possible.

Figure 7:
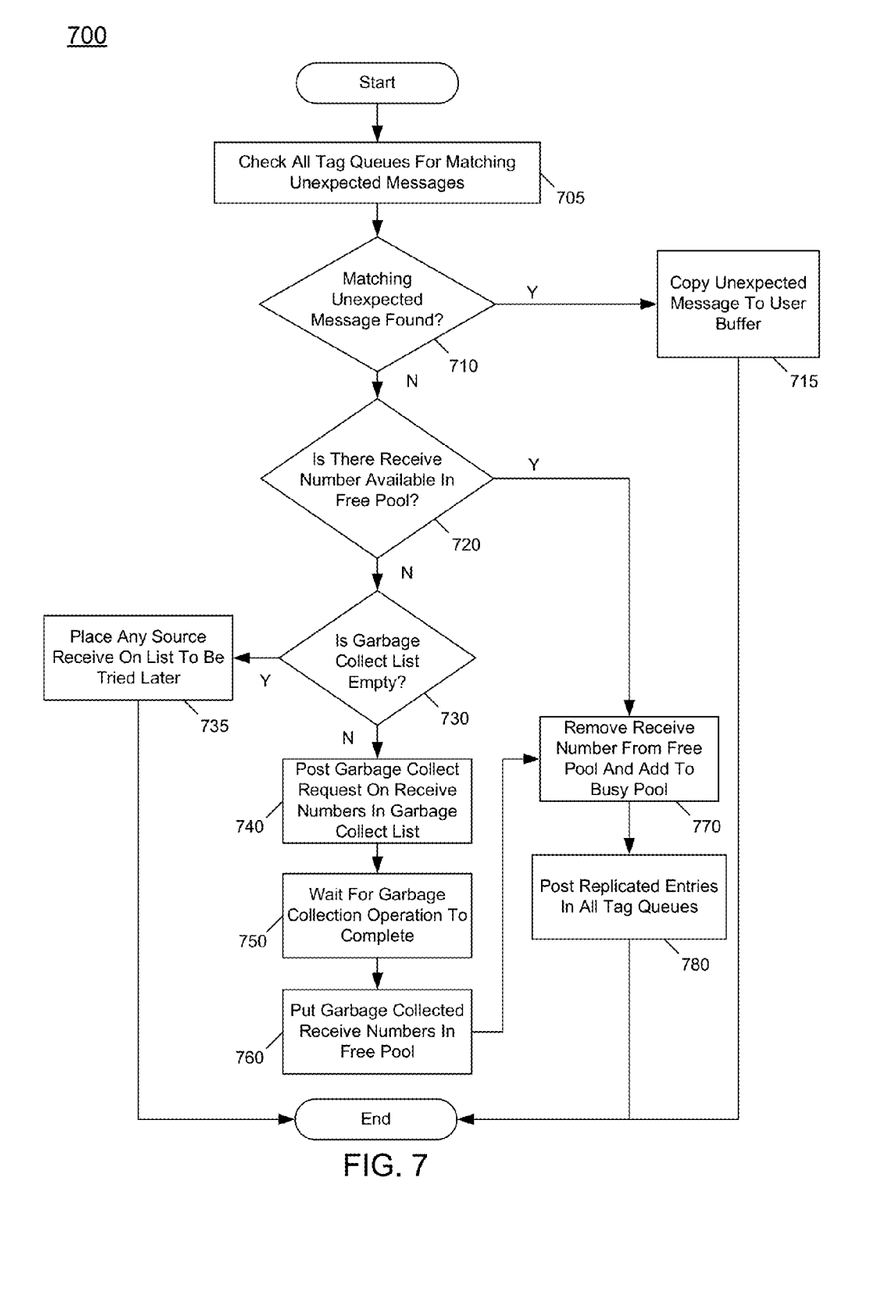
FIG. 7 is a flow diagram of a method in accordance with a still further embodiment of the present invention.

Referring now to FIG. 7, shown is a flow diagram of a method in accordance with a still further embodiment of the present invention. More specifically, method 700 shown in FIG. 7 may be performed in a receiver when an application initiates a wild card receive operation. As illustrated, method 700 begins by checking all tag queues for matching unexpected messages (block 705). Next it is determined at diamond 710 whether there was a matching unexpected message found. If so, control passes to block 715 where the unexpected message is copied to a user buffer for the receive process.

Still referring to FIG. 7, otherwise control passes to diamond 720 to determine whether there is a receive number available in the free pool. If so, control passes to block 770 where a receive number is removed from the free pool and added to a busy pool. Thereafter at block 780, replicated entries may be posted in all tag queues that one or more senders may target (e.g., all of a plurality of parallel tag queues, as described herein).

Still referring to FIG. 7 if instead at diamond 720 it is determined that there is no receive number available in the free pool, control passes to diamond 730 to determine whether the garbage collect list is empty. If so, at block 735 a source receive can be placed on a list to be tried later. Otherwise if the garbage collect list is not empty, at block 740 a garbage collect request may be posted. More specifically this request may be posted on receive numbers in the garbage collect list. Then at block 750 the operation may wait for this garbage collection process to be completed. After completion of such garbage collection, at block 760 one or more receive numbers that were garbage collected may be placed into the free pool, such that control can then pass to block 770 (discussed above), where a receive number can be moved from the free pool to the busy pool. Understand while shown at this high level in the embodiment of FIG. 7, many variations and alternatives are possible.

Figure 8:
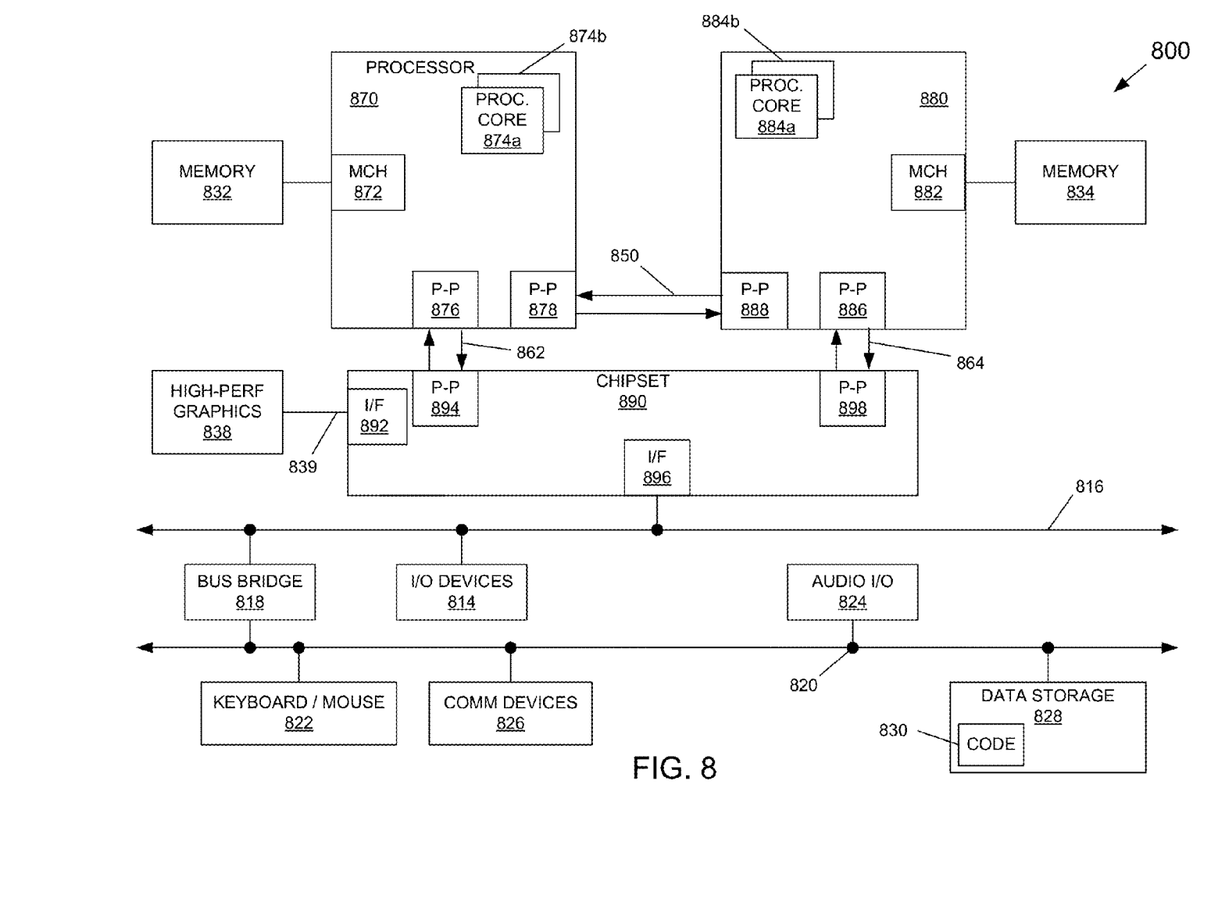
FIG. 8 is a block diagram of a system in accordance with an embodiment of the present invention.

Referring now to FIG. 8, shown is a block diagram of a system in accordance with an embodiment of the present invention. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874a and 874b and processor cores 884a and 884b). Understand that system 800 may be configured as a sending node and/or a receiving node, and may implement a MPI library and multiple user processes to leverage the efficient wild card matching operations as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

Embodiments may be incorporated in different types of hardware such as within a host fabric interface (for example) to speed up tag queue search and enable faster application performance. In other embodiments, the techniques described herein may be to improve tag queue searching within a given software environment.

The following Examples pertain to further embodiments.

In one example, an apparatus includes: a plurality of queues, where the plurality of queues includes a plurality of first entries to store receive information for a process; a master queue including a plurality of second entries to store wild card receive information, where redundant information of the plurality of second entries is to be included in a plurality of redundant entries of the plurality of queues; and a control circuit to match an incoming receive operation within one of the plurality of queues.

In an example, the control circuit is to cause an atomic operation to occur between a matching redundant entry of a first queue of the plurality of queues and a corresponding second entry of the master queue.

In an example, the atomic operation comprises a compare and swap operation to cause buffer information stored in the corresponding second entry of the master queue to be stored in the matching redundant entry of the first queue.

In an example, responsive to the compare and swap operation, data of the incoming receive operation is to be copied to a buffer of a first process, based at least in part on the buffer information.

In an example, the control circuit is to invalidate the corresponding second entry of the master queue after the compare and swap operation.

In an example, the control circuit is to cause a matching redundant queue entry of at least some of the plurality of queues to be removed from the at least some of the plurality of queues after the corresponding second entry of the master queue is invalidated.

In an example, the control circuit is to remove the matching redundant entry of the first queue after the data is copied to the buffer of the first process.

In an example, the control circuit is to associate a common receive identifier with a first set of the plurality of redundant entries of the plurality of queues and a corresponding second entry of the master queue.

In an example, the control circuit comprises a message passing interface library.

In an example, the apparatus comprises at least one of a host fabric interface and a processor to couple to the host fabric interface.

In another example, a method includes: matching an incoming message received in a first computing system in a first tag queue of a plurality of parallel tag queues; responsive to matching the incoming message in a replicated entry of the first tag queue, performing an atomic compare and swap operation with a corresponding entry in a master wild card queue coupled to the plurality of parallel tag queues; and copying data associated with the incoming message to a buffer of a receive process, based at least in part on information stored in the replicated entry of the first tag queue.

In an example, the method further comprises: writing a completion entry having a set wild card indicator after copying the data; and removing the replicated entry from the first tag queue.

In an example, the method further comprises: copying the data to the buffer if a receive number in the replicated entry matches a receive number of the corresponding entry in the master wild card queue; and otherwise removing the replicated entry from the first tag queue, without copying the data.

In an example, the method further comprises, after removing the replicated entry, writing a completion entry having a set stale indicator.

In an example, the method further comprises: receiving a wild card receive operation from an application; posting a replicated entry in the plurality of parallel tag queues; and associating the replicated entry in the plurality of parallel tag queues with a corresponding entry in the master wild card queue.

In an example, the method further comprises: receiving a second incoming message in the first computing system; and storing the second incoming message in an unexpected message queue if the second incoming message does not match in any of the plurality of parallel tag queues.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes: a network interface to couple to a network; a plurality of queues coupled to the network interface, the plurality of queues including a plurality of first entries to store receive information for a process and a plurality of redundant entries to store wild card receive information; a second queue coupled to the plurality of queues, the second queue including a plurality of second entries to store the wild card receive information; and at least one processor to execute an atomic operation between a first redundant entry of a first queue of the plurality of queues and a first second entry of the second queue.

In an example, the atomic operation comprises a compare and swap operation to cause buffer information stored in the first second entry of the second queue to be stored in the first redundant entry of the first queue.

In an example, responsive to the compare and swap operation, the at least one processor is to copy data of an incoming receive operation to a buffer of a first process, based at least in part on the buffer information.

In an example, the at least one processor is to cause a receive number associated with the first redundant entry of the first queue to be placed to a free pool responsive to completion of the incoming receive operation.

Understand that various combinations of the above examples are possible.

Note that the terms "circuit" and "circuitry" are used interchangeably herein. As used herein, these terms are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a plurality of queues, wherein the plurality of queues includes a plurality of first entries to store receive information for a process and a plurality of replica wild card entries:
a master queue including a plurality of second entries to store wild card receive information, wherein redundant information stored in the plurality of second entries is to be included stored in the plurality of redundant replica wild card entries of the plurality of queues, each of the plurality of replica wild card entries to point to one of the second entries in the master queue: and
a control circuit to match an incoming receive operation within one of the plurality of queues, wherein the control circuit is to cause an atomic operation to occur between a matching replica wild card entry of a first queue of the plurality of queues and a corresponding second entry of the master queue, the atomic operation comprising a compare and swap operation to cause buffer information stored in the corresponding second entry of the master queue store in the matching replica wild card entry of the first queue, and wherein responsive to the compare and swap operation, data of the incoming receive operation is to be copied to a buffer of a first process, based at least in part on the buffer information.

2. The apparatus of claim 1, wherein the control circuit is to invalidate the corresponding second entry of the master queue after the compare and swap operation.

3. The apparatus of claim 2, wherein the control circuit is to cause a matching redundant queue entry of at least some of the plurality of queues to be removed from the at least some of the plurality of queues after the corresponding second entry of the master queue is invalidated.

4. The apparatus of claim 1, wherein the control circuit is to remove the matching redundant entry of the first queue after the data is copied to the buffer of the first process.

5. The apparatus of claim 1, wherein the control circuit is to associate a common receive identifier with a first set of the plurality of redundant entries of the plurality of queues and a corresponding second entry of the master queue.

6. The apparatus of claim 1, wherein the control circuit comprises a message passing interface library.

7. The apparatus of claim 1, wherein the apparatus comprises at least one of a host fabric interface and a processor to couple to the host fabric interface.

8. A non-transitory machine-readable medium having stored thereon instructions, which if performed by a machine cause the machine to perform a method comprising:
matching an incoming message received in a first computing system in a first tag queue of a plurality of parallel tag queues;
responsive to matching the incoming message in a replicated entry of the first tag queue, performing an atomic compare and swap operation with a corresponding entry in a master wild card queue coupled to the plurality of parallel tag queues, the replicated entry to point to the corresponding entry in the master wild card queue, wherein the atomic operation comprises the compare and swap operation to cause buffer information stored in the corresponding entry in the master wild card queue to store in the replicated entry of the first tag queue; and
copying data associated with the incoming message to a buffer of a receive process, based at least in part on information stored in the replicated entry of the first tag queue.

9. The non-transitory machine-readable medium of claim 8, wherein the method further comprises: writing a completion entry having a set wild card indicator after copying the data; and removing the replicated entry from the first tag queue.

10. The non-transitory machine-readable medium of claim 8, wherein the method further comprises:
copying the data to the buffer if a receive number in the replicated entry matches a receive number of the corresponding entry in the master wild card queue; and
otherwise removing the replicated entry from the first tag queue, without copying the data.

11. The non-transitory machine-readable medium of claim 10, wherein the method further comprises, after removing the replicated entry, writing a completion entry having a set stale indicator.

12. The non-transitory machine-readable medium of claim 8, wherein the method further comprises:
receiving a wild card receive operation from an application;
posting a replicated entry in the plurality of parallel tag queues; and
associating the replicated entry in the plurality of parallel tag queues with a corresponding entry in the master wild card queue.

13. The non-transitory machine-readable medium of claim 8, wherein the method further comprises:
receiving a second incoming message in the first computing system; and
storing the second incoming message in an unexpected message queue if the second incoming message does not match in any of the plurality of parallel tag queues.

14. A system comprising:
a network interface to couple to a network;
a plurality of queues coupled to the network interface, the plurality of queues including a plurality of first entries to store receive information for a process and a plurality of redundant entries to store wild card receive information;
a second queue coupled to the plurality of queues, the second queue including a plurality of second entries to store the wild card receive information; and
at least one processor to execute an atomic operation between a first redundant entry of a first queue of the plurality of queues and a first second entry of the second queue, the first redundant entry of the first queue to point to the first second entry of the second queue, the atomic operation comprising a compare and swap operation to cause buffer information stored in the first second entry of the second queue store in the first redundant entry of the first queue, wherein responsive to the compare and swap operation, the at least one processor is to copy data of an incoming receive operation to a buffer of a first process, based at least in part on the buffer information.

15. The system of claim 14, wherein the at least one processor is to cause a receive number associated with the first redundant entry of the first queue to be placed to a free pool responsive to completion of the incoming receive operation.

* * * * *